April 15, 1924.

C. F. GARRATT

AUTOMATIC WEIGHING MACHINE

Filed June 18, 1923     3 Sheets-Sheet 1

1,490,817

Inventor
C. F. Garratt
By Marks & Clerk
Attys.

April 15, 1924.

C. F. GARRATT

AUTOMATIC WEIGHING MACHINE

Filed June 18, 1923   3 Sheets-Sheet 2

1,490,817

Inventor
C. F. Garratt
By Marks & Clerk
Attys.

April 15, 1924. 1,490,817
C. F. GARRATT
AUTOMATIC WEIGHING MACHINE
Filed June 18, 1923  3 Sheets-Sheet 3

Inventor
C. F. Garratt
By Marks & Clerk
Attys.

Patented Apr. 15, 1924.

1,490,817

UNITED STATES PATENT OFFICE.

CHARLES FREDERICK GARRATT, OF NUNEATON, ENGLAND.

AUTOMATIC WEIGHING MACHINE.

Application filed June 18, 1923. Serial No. 646,209.

*To all whom it may concern:*

Be it known that I, CHARLES FREDERICK GARRATT, a British subject, residing at Manor Grange, Manor Park Road, Nuneaton, in the county of Warwick, England, have invented certain new and useful Improvements Relating to Automatic Weighing Machines, of which the following is a specification.

This invention relates to automatic weighing machines of the type in which the supply of powdered, granular or like material from a hopper to the weighing pan is controlled by a pair of slide valves or sluices, ordinarily termed the main and dribble sluices. The object of the invention is to provide a machine of simple and robust construction which is relatively inexpensive and well adapted for the general requirements of such users as wholesale grocers.

In the three accompanying sheets of explanatory drawings:—

Figure 4 is a detail view illustrating the retaining and releasing mechanisms in conjunction with the delivery door of the weigh pan.

In the construction of an automatic machine as illustrated for weighing tea, sugar, rice and like materials, a horizontal table $a$ supported on side plates or brackets, has mounted on its upper side a supply hopper $b$, and below the table is arranged a weigh beam $c$ carrying at its outer end a weigh pan $d$. The latter is fitted at its lower end with a hinged and counterweighted discharge door $e$ which is normally held closed by a catch lever $f$ pivoted on the pan and arranged to engage a projection $g$ on the door. On the underside of the table is arranged the main sluice $h$, which can slide horizontally between guides $i$ on the underside of the table across the aperture $j$ at the lower end of the supply hopper. The main sluice is formed with a small aperture $k$ through which can flow the dribble feed, and this is controlled by the dribble sluice $l$ which can slide between guides $m$ on the underside of the main sluice. The feed aperture in the table is adjustable by a pair of oppositely movable plates $n$ actuated by screws $o$, the size of the aperture being varied by manipulation of the screws to suit different requirements.

For actuating the sluices a vertical shaft $p$ is mounted beneath the table, and at the upper end of the shaft is arranged an arm $q$ adapted to impart the required movements to the main sluice. Preferably a pair of projections $r$ are provided on the main sluice for engagment by the arm. In one half of each revolution of the shaft, the arm engages one of the projections and imparts an opening movement to the main sluice. At the end of this movement the arm disengages the said projection and after a suitable interval of idle movement engages the other projection. With the continuation of the movement of the arm the sluice is closed. With the closing of the main sluice the motion of the shaft is automatically stopped, and the sluice is not re-opened until the weigh pan has been discharged. Subsequently the arm leaves the second projection and passes into engagement with the first projection, and the cycle of operations is then repeated.

Figure 1:
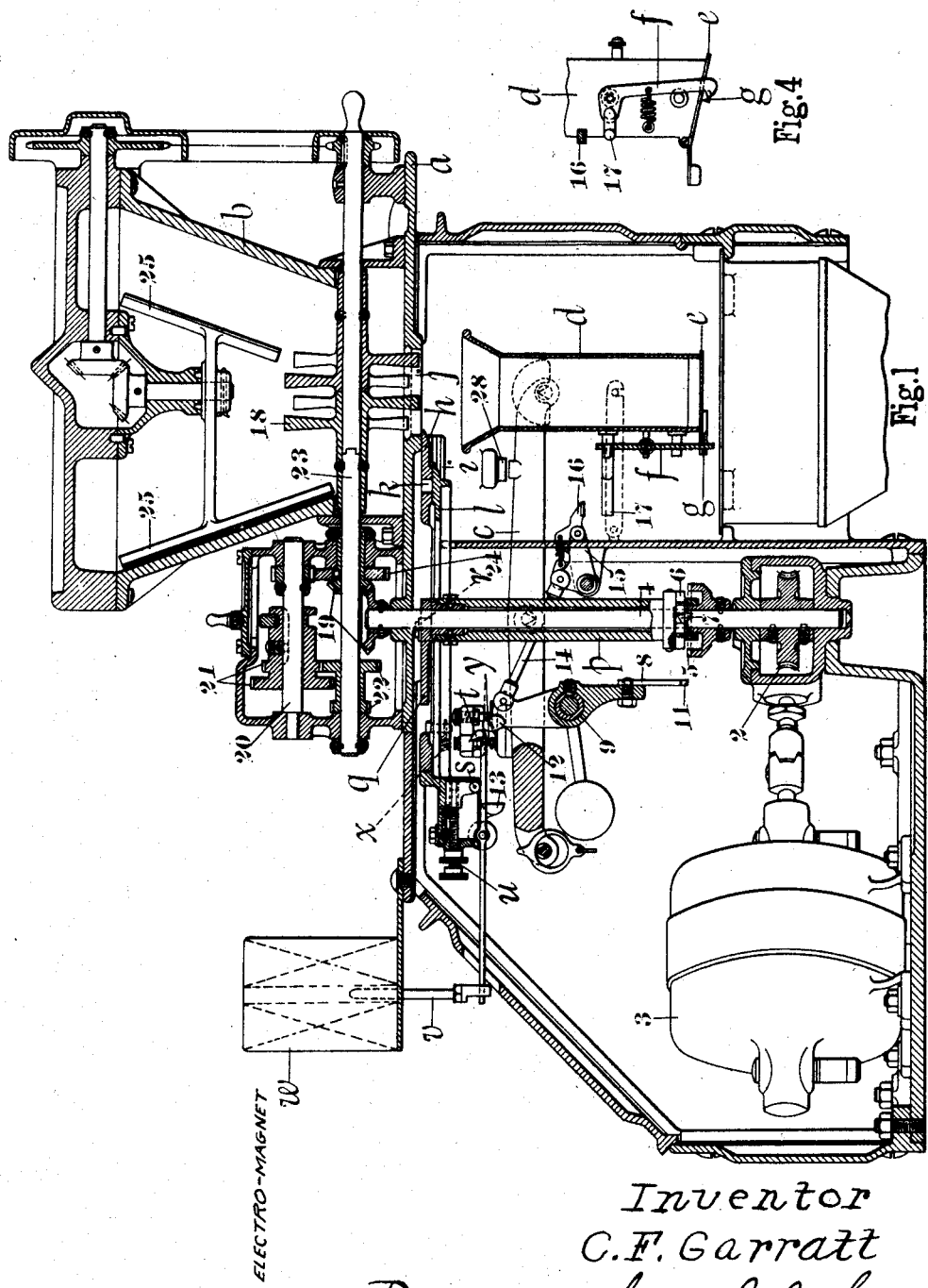
Figure 1 is a sectional side elevation of a machine constructed in accordance with this invention.
Figure 2:
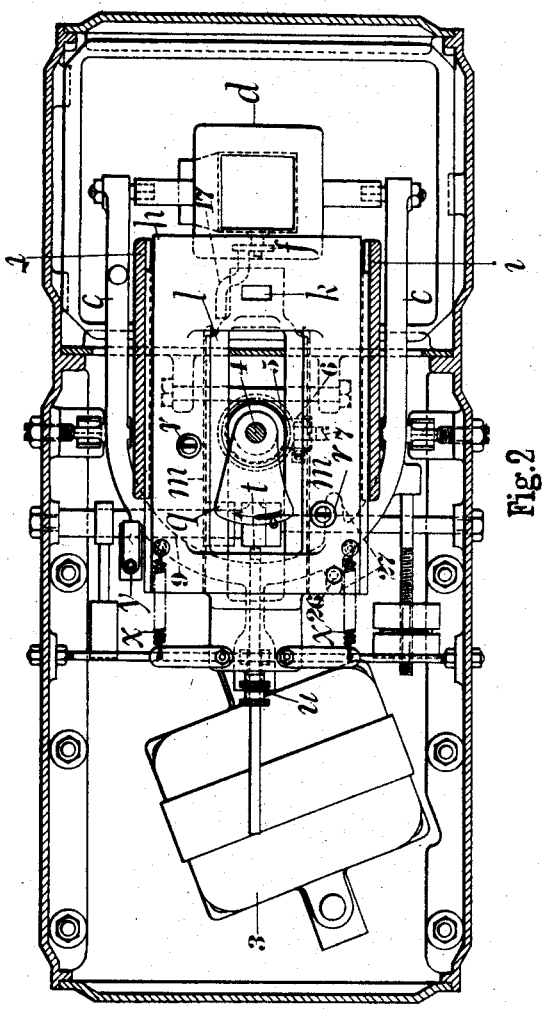
Figure 2 is a sectional plan, and Figure 3 a rear view with the driving motor omitted.
Figure 3:
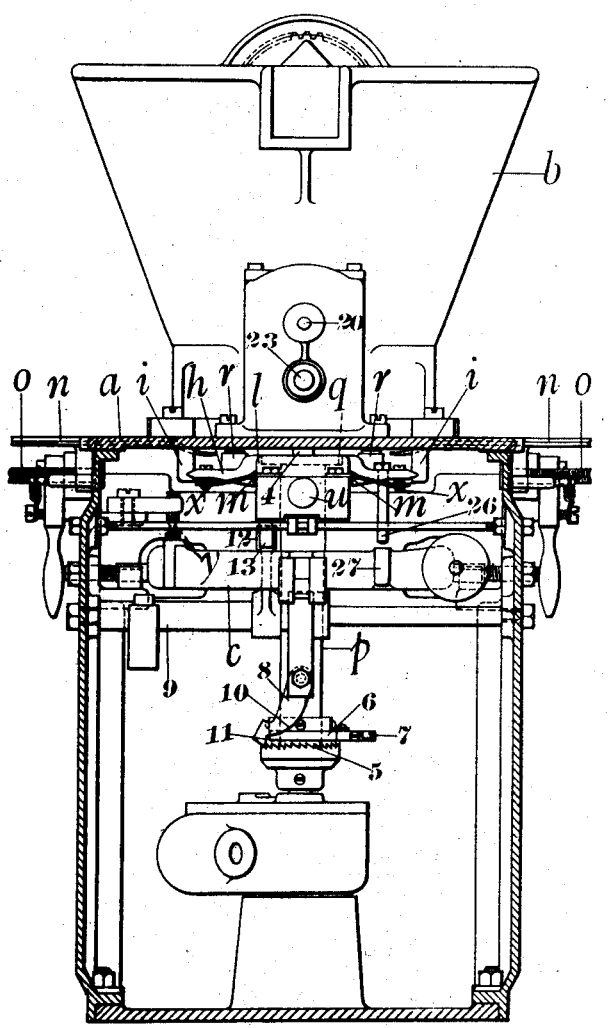

As already stated, the dribble sluice is carried on the main sluice, and in the opening movement of the main sluice the dribble sluice is carried with it. When the main sluice approaches the end of its opening movement an abutment $s$ on the dribble sluice passes over a hinged catch $t$ which during the return movement of the main sluice engages the abutment and by holding the dribble sluice causes the dribble feed aperture to be opened and to remain open after the main feed aperture has been closed. The size of the dribble aperture can be varied by adjusting the position of the abutment $s$ relatively to the dribble sluice. This can be effected by a screw $u$. The release of the dribble sluice is effected by the plunger $v$ of an electromagnet $w$ which is under the control of the weigh beam. When released the closing movement of the dribble sluice is effected by springs $x$ (Figure 2) attached to the main sluice. The control of the circuit through the electromagnet is effected by fixed and movable contacts $y$, the movable contacts being carried on the weigh beam. Instead of arranging the contacts as shown, they may be situated on the outside of the machine, preferably enclosed, and actuation of the movable contact may be effected through a lateral projection either from the beam or from the said contact.

For automatically connecting the above mentioned vertical shaft with the source of motion any suitable clutch is used. Preferably I employ the following driving and clutch mechanism. Beneath the shaft $p$ and coaxially with it is arranged a worm wheel 2 driven through a worm from an electric motor 3 or other convenient source of motion, this worm wheel being secured to a vertical shaft 4. Preferably the shaft $p$ is hollow, and the shaft 4 is continued upwards through the shaft $p$ for operating the stirrer mechanism hereinafter described. Above the worm wheel is secured on the shaft 4 a member 5 forming one element of the clutch, the said element having teeth provided on its upper face. The complementary clutch element 6 secured to the shaft $p$ is provided with a laterally projecting pivoted catch 7 which at its inner end is adapted to engage the clutch teeth of the element 5 and at its outer end is adapted to be engaged by one end of a counterweighted lever 8 secured to a rocking shaft 9 mounted transversely between the sides of the machine. When the shaft $p$ approaches the end of each of its rotary movements the outer end of the catch 7 comes into contact with the inclined or curved portion 10 of the lever 8 and in the succeeding movement the inner end of the catch is raised out of engagement with the clutch member 5. The extremity 11 of the lever 8 serves as a stop for engaging the outer end of the catch and arresting the rotation of the shaft $p$.

The rocking cross shaft 9 also has attached to it a tappet lever 12 which receives motion from a projection 13 at the underside of the dribble sluice. This tappet is connected by a link 14 with a lever 15 on the outer end of which is hinged a spring controlled striker 16 for acting on a projection 17 secured to the lever $f$ on the pan. The striker is so arranged that it is rigid with the lever 15 during the downward movement, but during the upward movement it can yield and pass idly by the said projection 17.

To maintain a uniform flow of material from the hopper to the weigh pan, the lower end of the hopper is provided with any convenient rotary stirrer 18 driven through bevel or other wheels 19 from the upper end of the vertical shaft 4. Preferably a convenient change speed mechanism is provided between the shaft 4 and the stirrers to enable the speed of rotation to be varied to suit different requirements. The mechanism shown comprises a counter shaft 20 with wheels 21 which can be engaged individually with wheels 22 on the stirrer shaft 23. Motion is transmitted from the counter shaft to the stirrer shaft through wheels 24. Also an additional stirrer 25 may be provided in the hopper, this being driven from the shaft 23 through chain and sprocket gearing as shown.

Each cycle of operations is as follows: Assuming the clutch to have been brought into action, the first effect of the rotation of the vertical shaft $p$ is to move the sluice operating arm $q$ into engagement with the main sluice and subsequently open the sluice. Material now flows from the hopper to the weigh pan. The main feed will continue until the main sluice has been reclosed at the end of one revolution of the vertical shaft. The variable aperture beneath the hopper is so adjusted that during the opening and closing interval of the main sluice approximately the required amount of material is delivered to the weigh pan. When the main sluice reaches the end of its closing movement the clutch catch 7 is disengaged from the clutch element 5 and the motion of the shaft is arrested. Subsequently material flows through the dribble feed aperture, the dribble sluice being held open by the catch. As soon as the proper weight of material has been delivered to the weigh pan the weigh beam tips, closes the circuit of the electromagnet and causes the dribble sluice to be released. During the closing movement of the dribble sluice under the action of the springs, the projection 13 on the sluice strikes the tappet 12. This has the effect of releasing through the lever 15 the catch lever $f$ which holds up the weigh pan door, and also of withdrawing the above mentioned lever 8 from the clutch catch 7. The latter then automatically moves under the action of a spring into engagement with the clutch element 5 and causes the vertical shaft to be again set in motion. During the movement of the arm on the upper end of the vertical shaft $p$ into engagement with the next projection on the main sluice by which the latter is opened, the weigh pan discharges its contents, the door returns to its closed position and is re-engaged by its catch. Meanwhile the lever which normally engages the clutch catch is held out of action. Subsequently the main sluice is again opened, the projection on the dribble sluice releases the tappet on the cross shaft and permits the clutch engaging lever to move into its active position. The lever 15 also returns and in this movement the striker 16 passes idly over the projection 17 on the lever $f$. The above described cycle of operations is then repeated.

To prevent tilting of the beam when the main bulk of material is delivered to the pan through the main sluice a projection 26 is arranged on the underside of the main sluice and adapted to co-operate with an abutment surface 27 on the rear of the beam. When the sluice is closed, as it is when the dribble sluice is in operation, the projection 26 is clear of the abutment and does not interfere with the required free movement of the beam.

To limit the upward movement of the forward end of the beam when the latter is returning after discharge of the weigh pan a stop 28 is arranged over the beam.

Having thus described my invention what I claim as new and desire to secure by Letters Patent is:—

1. In automatic weighing machines of the type specified, the combination with a supply hopper, a weigh beam, a weigh pan on the beam, and a discharge door at the lower side of the pan, of horizontally slidable main and dribble sluices, a vertical main shaft located beneath the sluices, means on the upper end of the shaft for imparting opening and closing movements from the shaft to the main sluice, an automatic clutch for engaging and disengaging the said vertical shaft to and from a continuously rotating source of motion, and means actuated from the dribble sluice for controlling the clutch and the discharge door of the weigh pan, substantially as described.

2. In automatic weighing machines of the type specified, the combination with a supply hopper, a weigh beam, a weigh pan on the beam, and a discharge door at the lower side of the pan, of a horizontally movable main sluice, a horizontally movable dribble sluice carried on the main sluice, a vertical shaft, an arm on the said shaft for imparting positive movements in both directions to the main sluice, a spring for imparting closing movements to the dribble sluice, an automatic clutch for driving the shaft, and opening mechanism for the door of the weigh pan, both clutch and door mechanism being under the control of the dribble sluice, substantially as described.

3. In automatic weighing machines as claimed in claim 2, a catch for holding the dribble sluice in the open position, and an electromagnet under the control of the weigh beam for releasing the catch, substantially as described.

4. In automatic weighing machines having the feature claimed in claim 3, an adjustable abutment on the dribble sluice for engagement by the catch, substantially as described.

5. In an automatic weighing machine as claimed in claims 1 and 2, an automatic clutch comprising a continuously rotating notched driving element and a pivoted catch lever arranged on the driven element and adapted to engage the driving element, and a lever movable by the dribble sluice for disengaging and releasing the clutch catch lever, substantially as described.

6. In automatic weighing machines as claimed in claim 1, the combination comprising a locking lever for securing the delivery door of the weigh pan, a lever actuated by the dribble sluice, and a hinged striker on the end of the sluice operated lever for actuating the door locking lever, substantially as described.

7. In automatic weighing machines as claimed in claim 1, the combination comprising a stirrer in the hopper, and variable speed mechanism in conjunction with the sluice operating mechanism for transmitting motion to the stirrer, substantially as described.

8. In automatic weighing machines of the type specified, the combination comprising a hopper, a weigh beam, a weigh pan on the beam, a hinged discharge door beneath the pan, means for locking the door in the closed position, a horizontally movable main sluice, a horizontally movable dribble sluice carried on the main sluice and movable by the same in one opening direction, a spring for closing the dribble sluice, a two part vertical shaft one part of which is rotated continuously, an automatic clutch for connecting the parts, an arm on the upper end of the other part for imparting opening and closing movements to the main sluice, a catch for engaging the dribble sluice in the open position, an electromagnet under the control of the weigh beam for releasing the catch, and lever mechanism actuated by the dribble sluice for controlling the clutch and the discharge door locking mechanism, substantially as described.

In testimony whereof I have signed my name to this specification.

CHARLES FREDERICK GARRATT.